Patented Jan. 10, 1939

2,143,493

UNITED STATES PATENT OFFICE 2,143,493

PRODUCTION OF CONDENSATION PRODUCTS OF AROMATIC HYDROCARBONS WITH UNSATURATED ALIPHATIC HYDROCARBONS

Herbert Muggleton Stanley, Tadworth, Gregoire Minkoff, Epsom, and James Ernest Youell, Wallington, England No Drawing. Application October 15, 1937, Serial No. 169,330. In Great Britain October 30, 1936

7 Claims. (Cl. 260—671)

This invention relates to the production of condensation products of aromatic hydrocarbons with unsaturated aliphatic hydrocarbons containing from 3 to 5 carbon atoms.

It is known that aromatic hydrocarbons such as benzene may be condensed with unsaturated aliphatic hydrocarbons by Friedel and Craft's reaction and employing aluminium chloride as condensing agent and it has been proposed to use strong sulphuric acid for the purpose. In order to use strong sulphuric acid for production of the condensation products on a commercial scale and in a manner permitting of continuous operation certain novel conditions hereinafter stated need to be observed and constitute the essential features of the present invention. By observing such conditions the consumption of acid per unit volume of product formed can be kept low and the formation of undesired by-products such as sulphates can be materially reduced. The above mentioned conditions are:

(1) Observing a reaction temperature of from about 0° C. to 25° C., preferably below 10° C.

(2) Using a considerable excess of the aromatic hydrocarbon over the unsaturated aliphatic hydrocarbon, e. g. at least 2 mols. of benzene to 1 mol. of propylene when the mono-alkylated aromatic hydrocarbon is desired, and (3) For continuous operation using sulphuric acid of from say 96 to 98 per cent strength, separating the reaction product from the spent acid (by settling and decantation), washing the reaction product with a relatively small quantity of fresh concentrated sulphuric acid, say from 2 to 5 per cent by volume of 98 per cent acid to each volume of product, and returning the washing acid to the reaction stage.

The unsaturated aliphatic hydrocarbon used need not be pure but may be a mixture of olefines, as obtained in the cracking of oils, and the presence of ethylene is of no consequence as it emerges from the condensation practically unchanged.

Examples of continuous condensation as above described are hereinafter set forth.

The alkylated aromatic hydrocarbons obtained according to the present invention may be converted by pyrolysis into styrene and the like and eventually by polymerization into resins as described and claimed in the specifications of our patent applications Ser. No. 169,331 and Ser. No. 169,332 of even date.

The following are examples of condensing benzene and propylene in accordance with the present invention.

*Example 1*

Generally speaking, the procedure was to pass continuously from separate sources propylene, benzene, and fresh 98% sulphuric acid plus sulphuric acid derived from the product-washing stage of a previous operation into a well-cooled mixing and reaction chamber consisting of a long length of small bore steel tubing, externally cooled with brine, under such conditions that a high linear liquid velocity was attained and the maximum temperature reached in the reaction tube did not exceed +8° C. The products of reaction were passed directly into a separator, from which spent acid was removed at the bottom and the hydrocarbon product was removed at the top. The hydrocarbon product removed at the top was then passed up a wash tower where it was continuously washed in countercurrent with a stream of fresh 98% sulphuric acid whereby practically all the di-isopropyl sulphate contained in it was removed. The acid collecting at the bottom was continuously mixed with the fresh acid being introduced into the reaction chamber while the acid-washed hydrocarbon product was continuously washed further first with water (to remove most of the sulphuric acid and sulphonic acids present) and finally with aqueous alkali and then subjected to fractionation to obtain first excess unchanged benzene (which can be re-used in the process), then mono-isopropylbenzene and finally di-isopropylbenzene, leaving a residue of higher-boiling materials including tetra-isopropylbenzene.

Stated specifically as regards quantities, the process consisted in reacting a mixture of 240 kg./hr. of benzene and 48.6 kg./hr. of pure propylene with concentrated acid as catalyst, continuously washing the crude reaction products with 10 kg./hr. of 98% sulphuric acid, and continuously using the latter after mixing with a further hourly feed of 98% sulphuric acid of 45 kg./hr. as the catalyst in the reaction zone. The hourly production of products was 106 kg. of mono-isopropylbenzene and 20 kg. of higher-boiling materials consisting mainly of p-di-isopropylbenzene.

*Example II*

At a feed rate of 300 kg./hr. of benzene and 56.2 kg./hr. of propylene (molar ratio 2.9 to 1), the acid catalyst consisted of 50 kg./hr. of fresh sulphuric acid and about 12–15 kg./hr. or sulphuric acid used in the washing stage. The hourly rate of products was 118.4 kg. of mono-isopropylbenzene and 25.0 kg. of a liquid consisting mainly of p-di-isopropylbenzene.

Example III

By using a mixture of benzene and propylene in the molar ratio of 1.2 to 1, the yield of p-di-isopropylbenzene was raised to about 30% of the total reaction product. This example shows that a ratio of aromatic hydrocarbon to aliphatic hydrocarbon of about 1 to 1 is suitable when a large proportion of the dialkylated product is desired.

Example IV

A mixture of 30% ethylene and 70% propylene was mixed with benzene in the molar ratio of 3 mols. of benzene to 1 mol. of propylene and using the same acid quantities as outlined in Example II. Practically all the propylene was combined with the benzene in the form of mono-isopropyl-benzene and di-isopropyl-benzene while the ethylene escaped substantially unchanged and was recovered in almost pure form.

What we claim is:

1. The method of producing alkylated aromatic hydrocarbons, which consists in condensing an unsaturated aliphatic hydrocarbon containing from three to five carbon atoms with an aromatic hydrocarbon, utilizing concentrated sulphuric acid as the condensing agent, removing the spent acid, washing the hydrocarbon product with a small quantity of concentrated sulphuric acid, and utilizing the latter after the washing operation for condensing further quantities of the starting hydrocarbons.

2. The method of producing alkylated aromatic hydrocarbons, which consists in condensing an unsaturated aliphatic hydrocarbon containing from three to five carbon atoms with an aromatic hydrocarbon, by reacting them in the presence of concentrated sulphuric acid at a temperature between 0° C. and 25° C., removing the spent acid, washing the hydrocarbon product with a small quantity of concentrated sulphuric acid, and utilizing the latter after the washing operation for condensing further quantities of the starting hydrocarbons.

3. The method of producing alkylated aromatic hydrocarbons, which consists in condensing an unsaturated aliphatic hydrocarbon containing from three to five carbon atoms with an aromatic hydrocarbon by reacting them in the presence of concentrated sulphuric acid at a temperature of about 10° C., removing the spent acid, washing the hydrocarbon product with a small quantity of concentrated sulphuric acid, and utilizing the latter after the washing operation for condensing further quantities of the starting hydrocarbons.

4. The method of producing alkylated aromatic hydrocarbons, which consists in condensing an unsaturated aliphatic hydrocarbon containing from three to five carbon atoms with an aromatic hydrocarbon by reacting them in the presence of concentrated sulphuric acid at a temperature between 0° C. and 25° C., removing the spent acid, washing the hydrocarbon product on the counter-current principle with a small quantity of concentrated sulphuric acid, and utilizing the latter after the washing operation for condensing further quantities of the starting hydrocarbons.

5. The method of producing alkylated aromatic hydrocarbons containing mainly mono-alkylated product, which consists in reacting an aromatic hydrocarbon with an unsaturated aliphatic hydrocarbon containing from three to five carbon atoms in the proportion of at least 2 mols. to 1 mol. at a temperature ranging from 0° C. to 25° C., utilizing concentrated sulphuric acid as the condensing agent, removing the spent acid, washing the hydrocarbon product with a small quantity of concentrated sulphuric acid, and utilizing the latter after the washing operation for condensing further quantities of the starting hydrocarbons.

6. The method of producing alkylated aromatic hydrocarbons containing a substantial proportion of di-alkylated product, which consists in reacting an aromatic hydrocarbon with an unsaturated aliphatic hydrocarbon containing from three to five carbon atoms in the proportion of about 1 mol. to 1 mol. at a temperature ranging from 0° C. to 25° C., utilizing concentrated sulphuric acid as the condensing agent, removing the spent acid, washing the hydrocarbon product with a small quantity of concentrated sulphuric acid, and utilizing the latter after the washing operation for condensing further quantities of the starting hydrocarbons.

7. The method according to claim 1, the unsaturated aliphatic hydrocarbon being admixed with other hydrocarbons natural to its origin.

HERBERT MUGGLETON STANLEY.
GREGOIRE MINKOFF.
JAMES ERNEST YOUELL.